United States Patent
Lee

(10) Patent No.: US 7,260,040 B2
(45) Date of Patent: Aug. 21, 2007

(54) METHOD AND APPARATUS TO DISPLAY STATUS OF AN OPTICAL RECORDING AND/OR REPRODUCING APPARATUS

(75) Inventor: Dong-han Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 650 days.

(21) Appl. No.: 10/757,501

(22) Filed: Jan. 15, 2004

(65) Prior Publication Data

US 2004/0141733 A1 Jul. 22, 2004

(30) Foreign Application Priority Data

Jan. 17, 2003 (KR) .................... 10-2003-0003256

(51) Int. Cl.
*G11B 5/09* (2006.01)
*G11B 7/00* (2006.01)

(52) U.S. Cl. ............... 369/53.2; 369/53.1; 369/47.1; 369/44.27

(58) Field of Classification Search ............... None
See application file for complete search history.

(56) References Cited

U.S. PATENT DOCUMENTS 5,309,249 A * 5/1994 Ishii ............................ 386/105

6,201,777 B1 * 3/2001 Tsuchiya et al. ........ 369/53.23

FOREIGN PATENT DOCUMENTS

| JP | 59-042667 | 3/1984 |
|----|-----------|--------|
| JP | 61-092470 | 5/1986 |
| JP | 10-233051 | 9/1998 |
| JP | 2000-30425 | 1/2000 |

OTHER PUBLICATIONS

Korean Office Action dated Apr. 26, 2005 in corresponding Korean App. No. 10-2003-0003256.

* cited by examiner

*Primary Examiner*—Muhammad Edun
(74) *Attorney, Agent, or Firm*—Staas & Halsey LLP

(57) ABSTRACT

A method and apparatus to display a status of an optical recording and/or reproducing apparatus. The method includes, determining a type of an optical disc loaded into a tray; transmitting a predetermined signal based on the determination result to a laser emitting diode module comprising at least two laser emitting diodes, which emit different color beams so that the laser emitting diode module emits a color beam based on the determined type of the optical disc.

22 Claims, 3 Drawing Sheets

METHOD AND APPARATUS TO DISPLAY STATUS OF AN OPTICAL RECORDING AND/OR REPRODUCING APPARATUS

CROSS-REFERENCE TO RELATED APPLICATIONS

This application claims the priority of Korean Patent Application No. 2003-3256, filed Jan. 17, 2003, in the Korean Intellectual Property Office, the disclosure of which is incorporated herein in its entirety by reference.

BACKGROUND OF THE INVENTION

1. Field of the Invention

The present invention relates to a method and apparatus to display a status of an optical recording and/or reproducing apparatus, more particularly, to a method and apparatus to display to a user a type of optical disc medium and an operation performed on the optical disc medium used in an optical recording and/or reproducing apparatus via emission of light from a laser emitting diode (LED).

2. Description of the Related Art

Optical recording and/or reproducing apparatuses are generally used to record or rewrite to and reproduce from Compact Disk Writables (CD-Rs), CD-rewritables (CD-RWs), Digital Versatile Disc (DVD-RWs), DVD–RWs, DVD+RWs, DVD-RAMs, and so forth. Because such optical recording and/or reproducing apparatuses can be compatibly used, optical recording and/or reproducing apparatuses for DVDs can also be used for CDs.

However, such conventional recording and/or reproducing apparatuses lack a device or a method that displays to a user whether an optical disc on or from which recording or reproducing is currently performed is a CD or a DVD. Further, the conventional recording and/or reproducing apparatuses do not comprise a device that displays to the user whether a presently-performed operation on the optical disc is a recording or reproducing operation. Thus, it is not convenient for the user to use the conventional recording and/or reproducing apparatuses.

In other words, since the conventional recording and/or reproducing apparatuses solely comprise one laser emitting diode (LED) provided to their front surfaces to emit monochromatic light, generally, such conventional apparatuses are unable to display to the user whether the optical disc is a CD or a DVD. Further, even where the conventional recording and/or reproducing apparatuses include two LEDs, the apparatuses display that the optical disc is a CD via one LED or display that the optical disc is a DVD via the other LED. In this case, two grooves must be formed in the front surfaces of the conventional recording and/or reproducing apparatuses to install the two LEDs. As a result, the two LEDs occupy a larger area, thus, increasing cost of manufacturing the conventional recording and/or reproducing apparatuses.

SUMMARY OF THE INVENTION

The present invention provides a method and apparatus to display to a user atype of optical disc and a currently-performed operation on the optical disc used in an optical recording and/or reproducing apparatus.

According to an aspect of the present invention, there is provided a method to display a status of an optical recording and/or reproducing apparatus. The method comprises: determining a type of an optical disc loaded into a tray; transmitting a predetermined signal based on the determination result to a laser emitting diode module comprising at least two laser emitting diodes, which emit different color beams so that the laser emitting diode module emits a color beam in accordance with the determined type of the optical disc.

Additional aspects and advantages of the invention will be set forth in part in the description which follows and, in part, will be obvious from the description, or may be learned by practice of the invention.

According to another aspect of the present invention, an apparatus to display a status of an optical recording and/or reproducing apparatus is provided. The apparatus comprises: an optical pickup to radiate light onto an optical disc and to receive the light reflected from the optical disc; a system controller to control the optical pickup, to determine a type of the optical disc from an optical signal received via the optical pickup, and to perform a servo operation depending on the determined type of the optical disc; and a laser emitting diode module connected to the system controller, having at least two laser emitting diodes, which emit different color beams so that the system controller drives the laser emitting diode module to emit a color beam in accordance with the determined type of the optical disc.

BRIEF DESCRIPTION OF THE DRAWINGS

The above and/or other aspects and advantages of the invention will become apparent and more readily appreciated from the following descriptions of the preferred embodiments, taken in conjunction with the accompanying drawings of which.

DETAILED DESCRIPTION OF THE PREFERRED EMBODIMENTS

Figure 1:
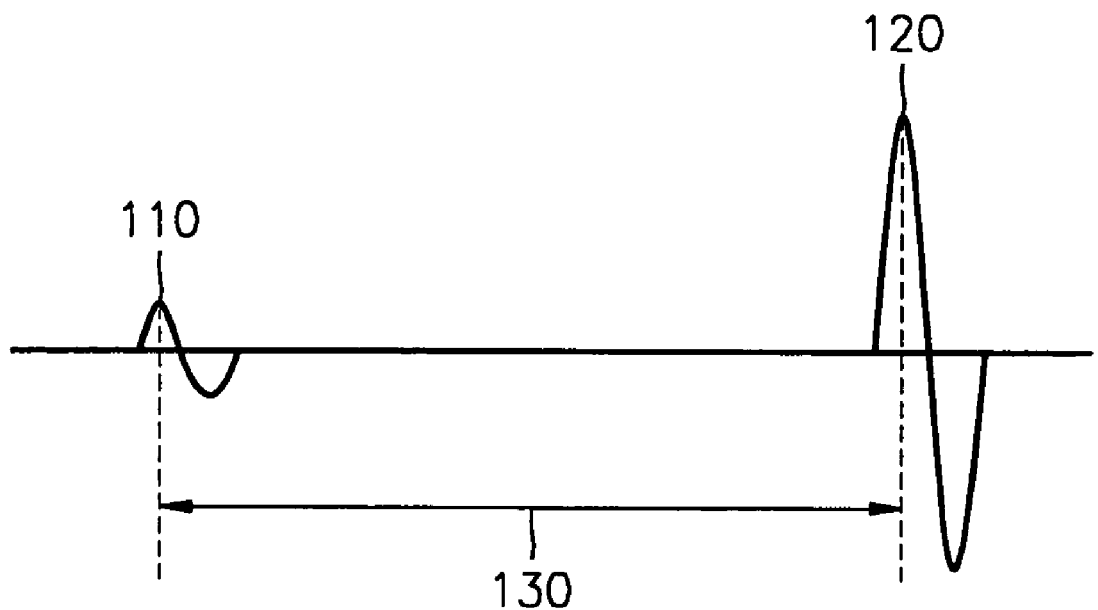
FIG. 1 is a graph to show signals detected to determine a type of an optical disc.

Reference will now be made in detail to the embodiments of the present invention, examples of which are illustrated in the accompanying drawings, wherein like reference numerals refer to the like elements throughout.

Figure 2:
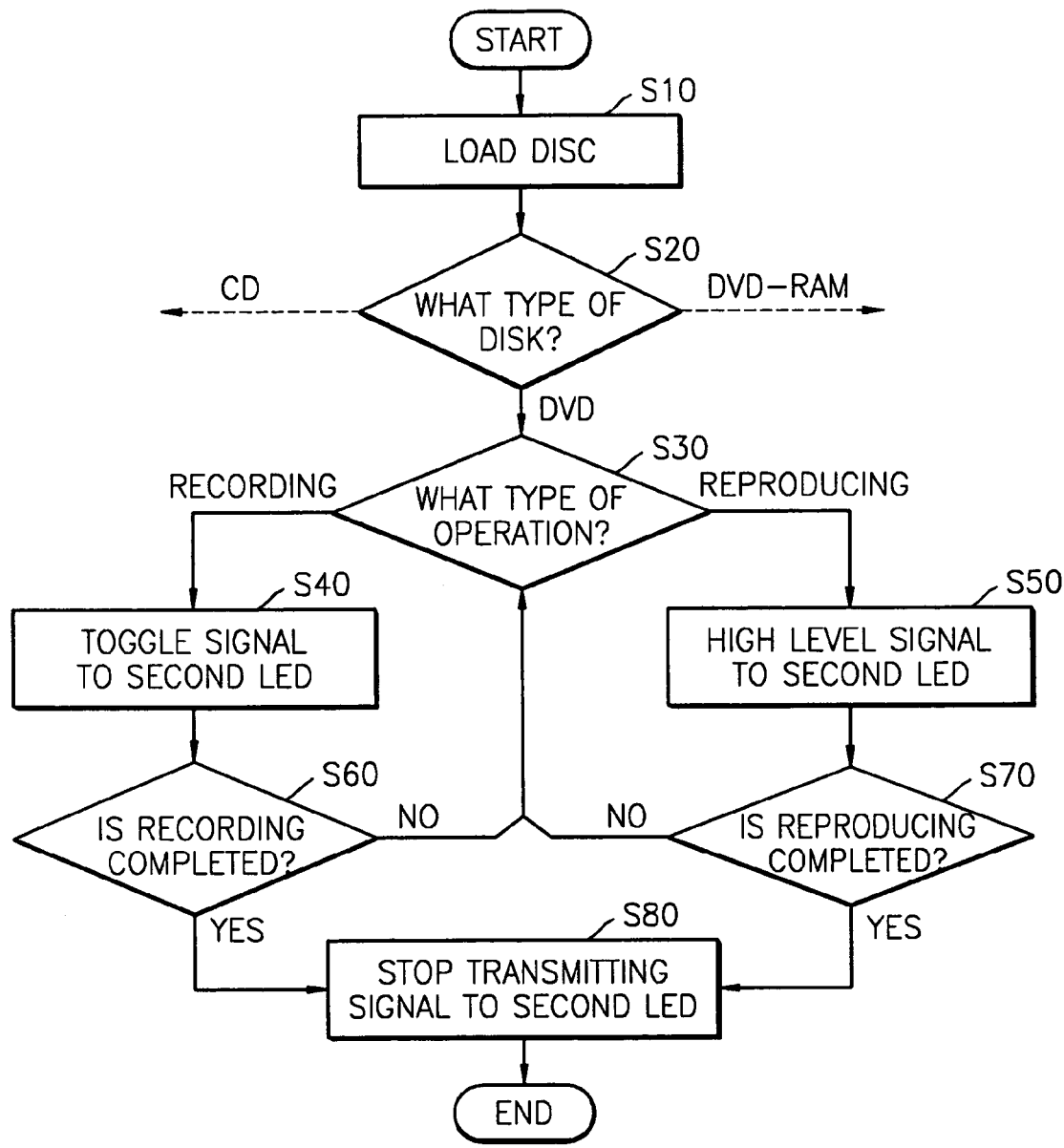
FIG. 2 is a flowchart to explain a method to display a status of an optical recording and/or reproducing apparatus according to an aspect of the present invention.
Figure 3:
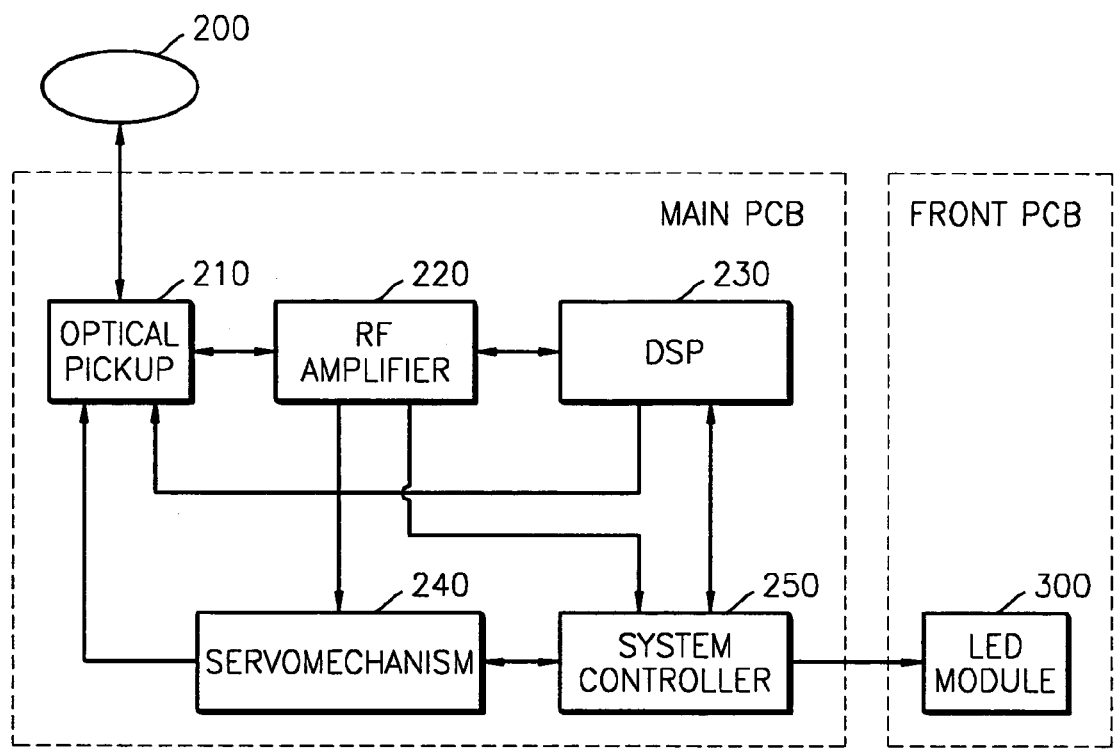
FIG. 3 is a block diagram of an optical recording and/or reproducing apparatus according to another aspect of the present invention.
Figure 4:
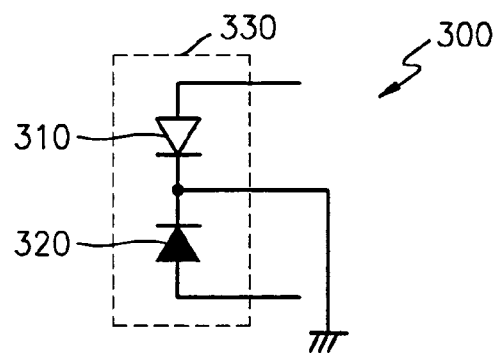
FIG. 4 is a circuit diagram of an LED module used in the optical recording and/or reproducing apparatus shown in FIG. 3.

FIG. 1 is a graph to show signals detected to determine a type of an optical disc, FIG. 2 is a flowchart to explain a method to display a status of an optical recording and/or reproducing apparatus according to an aspect of the present invention, FIG. 3 is a block diagram of an optical recording and/or reproducing apparatus according to an aspect of the present invention, and FIG. 4 is a circuit diagram of an LED module used in the optical recording and/or reproducing apparatus shown in FIG. 3.

As shown in FIG. 2, a method to display a status of an optical recording and/or reproducing apparatus according to an aspect the present invention includes operation S10 to load an optical disc into a tray and operation S20 to determine a type of the optical disc. According to another aspect of the invention, operation S20 may include other suboperation(s) and may use various algorithms in order to determine the type of the optical disc.

In order to illustrate the method and apparatus of the present invention, a CD and a DVD are taken as examples of the optical disc. In case of the DVD, a distance from a disc surface to a recording surface is 0.6 mm. In case of the CD, a distance from a disc surface to a recording surface is 1.2 mm. Also, the DVD and the CD use different wavelengths of a laser to record. Thus, a servo operation must be performed according to the type of the optical disc. Accordingly, operation S20 to determine the type of the optical disc is indispensable to a recording and/or reproducing apparatus using various types of optical discs.

Operation S20 will be described in more detail with reference to FIGS. 1 and 3.

After the optical disc is loaded into the tray, a laser diode (not shown) in an optical pickup 210 (shown in FIG. 3) is initialized. Next, when a lens of the optical pickup 210 descends to the lowest position, the laser diode radiates weak light that reaches the level of reproduction power onto an optical disc 200 during the ascent of the lens at a predetermined speed. As a result, an optical signal is reflected from the optical disc 200 to the optical pickup 210. The optical pickup 210 outputs the optical signal to a Radio Frequency (RF) amplifier 220. The RF amplifier 220 converts the optical signal received from the optical pickup 210 into an electric signal and detects a surface reflection signal 110 reflected from the surface of the optical disc 200 and an S-Curve signal 120 detected from a recording surface of the optical disc 200. A system controller 250 compares a time interval 130 (as shown in FIG. 1) between the surface reflection signal 110 and the S-Curve signal 120 detected by the RF amplifier 220 with a predetermined reference value and determines that the optical disc 200 is a DVD when distance between a disc surface and a recording surface is 0.6 mm and the time interval 130 (as shown in FIG. 1) is less than the predetermined reference value or determines that the optical disc 200 is a CD when distance between a disc surface and a recording surface is 1.2 mm and the time interval 130 (as shown in FIG. 1) is more than the predetermined reference value.

The above-described example shows a determination operation to ascertain whether an optical disc is a CD or a DVD. Further, whether the CD is a general CD, a CD-R, or a CD-RW may be determined according to another discrimination standard, and whether the DVD is one of various similar types of DVDs may be determined according to DVD discrimination standards.

After the type of the optical disc 200 is determined using the predetermined algorithm briefly described above, a recording or reproducing operation is performed in a recording or reproduction mode.

In the recording mode, a digital signal processor (DSP) 230 adds an error correcting code (ECC) to coded audio/video data and outputs a signal to drive the lens to the optical pickup 210 in response to a lens-up-and-down command output from the system controller 250.

The RF amplifier 220 converts an electric signal output from the DSP 230 into an optical signal. The optical pickup 210 includes an actuator, which focuses, tracks, and records the optical signal converted by the RF amplifier 220 on the optical disc 200.

A servomechanism 240 receives information to servo-control from the DSP 230 via the RF amplifier 220 and the system controller 250 to stably perform the servo.

The system controller 250 controls the entire system to record data on the optical disc 200 via the DSP 230, the RF amplifier 220, and the optical pickup 210.

In the reproduction mode, the optical pickup 210 reads an optical signal from the optical disc 200 on which data is recorded.

The RF amplifier 220 converts the optical signal output from the optical pickup 210 into an electric signal and extracts a servo signal to perform the servo and modulated data from the optical signal.

The DSP 230 demodulates the modulated data extracted by the RF amplifier 220, implements the ECC to correct errors, and outputs the signal to drive the lens to the optical pickup 210 in response to the lens-up-and-down signal output from the system controller 250.

The servomechanism 240 receives the information to control the servo from the RF amplifier 220 and the system controller 250 to stably perform the servo.

The system controller 250 controls the optical pickup 210, the RF amplifier 220, and the DSP 230 in response to a command input by the user.

As described above, the system controller 250 includes information in relation to an operation which is presently being performed on the optical disc 200 as well as information on the type of the optical disc 200 which is presently loaded into the tray.

After the determination of the type of the optical disc 200 loaded into the tray, an operation to transmit a predetermined signal is performed based on the determination result, to an LED module 300. The LED module 300 includes at least two LEDs that emit different color beams so that the LED module 300 emits a color beam suitable for the type of the optical disc 200.

FIG. 4 is a circuit diagram of the LED module 300 shown in FIG. 3. As shown in FIG. 4, the LED module 300 includes first and second LEDs 310 and 320Q which emit different color beams. Negative (N) nodes of the first and second LEDs 310 and 320 are grounded, and positive (P) nodes of the first and second LEDs 310 and 320 are connected to the system controller 250 to be used as input nodes. The first and second LEDs 310 and 320 are surrounded by a housing 330. At least one side of the housing 330 is made of a semitransparent or transparent window (hereinafter referred to as an emitting window) and is inserted into a groove (not shown), which is formed in a front surface of the optical recording and/or reproducing apparatus so that the emitting window can be seen on the front surface.

As can be seen in FIG. 3, two areas marked with dotted lines are formed. The left area denotes a main printed circuit board (PCB) of the optical recording and/or reproducing apparatus and the right area denotes a front PCB.

In a case where the system controller 250 outputs a high level signal only to the P node of the first LED 310, only the first LED 310 emits light. Similarly, in an event that the system controller 250 outputs the high level signal only to the P node of the second LED 320, only the second LED 320 emits light. When the system controller 250 outputs the high level signal simultaneously to the P nodes of the first and second LEDs 310 and 320, both the first and second LEDs 310 and 320 emit light.

In the above three cases, the emitting window which can be seen on the front surface of the optical recording and/or reproducing apparatus displays a color of a beam emitted from the first LED 310 in the first case, a color of a beam emitted from the second LED 320 in the second case, and a mixture of the colors of the beams emitted from the first and second LEDs 310 and 320.

As described above, the system controller 250 includes the information in relation to the operation, which is presently performed on the optical disc 200. Accordingly, as described previously the system controller 250 may output a signal to the first LED 310 and/or the second LED 320 based on the type of the optical disc 200 and appropriately modify the signal to display an operation which is presently performed on the optical disc 200. For example, during recording, the system controller 250 transmits a signal to the P node of the first LED 310 and/or the P node of the second LED 320 based on the type of the optical disc 200, and toggles the signal so that the signal is alternately high and low to allow the light to blink. During reproducing, the system controller 250 transmits a continuously high level signal to the P node of the first LED 310 and/or the P node of the second LED 320 to continuously emit light without a blink. These are shown in Table 1 below.

TABLE 1

| Type and Mode | | First LED | Second LED | Color |
|---|---|---|---|---|
| CD | Reproducing | High | Low | First LED color |
| | Recording | Toggle | Low | First LED color (Blink) |
| DVD | Reproducing | Low | High | Second LED color |
| | Recording | Low | Toggle | Second LED color (Blink) |
| DVD-RAM | Reproducing | High | High | Mixture of first and second LED colors |
| | Recording | Toggle | Toggle | Mixture of first and second LED colors (Blink) |

Table 1 above shows an example of an LED module including two types of LEDs. The LED module can emit three color beams except when both the first and second LEDs are turned off, and thus, can be used to display three types of optical discs. In a case where an LED module including three LEDs emitting different color beams is used, the LED module may emit $2^3-1=7$ color beams, and thus, be used to display 7 types of optical discs.

The flowchart of FIG. 2 shows a case where the optical disc 200 is a DVD. Operations of cases where the optical disc 200 is a CD and a DVD-RAM are omitted. The omitted operations can be understood by one of ordinary skill in the art from Table 1 above and the description of the present specification.

According to operation S30, a determination is made as to whether a recording operation or a reproducing operation is performed, and then a signal suitable for the determination result is input to the LED module 300. In other words, if after operation S30, it is determined that the recording operation is performed, in operation S40, a high level signal is toggled and then input to the second LED 320 so as to display that the recording operation is performed. However, after operation S30, if it is determined that the reproducing operation is performed, in operation S50, the high level signal is continuously input to the second LED 320.

According to operation S60, a determination is made as to whether the recording operation has been completed. And in operation S60, it is determined that the recording operation has not been completed, the method returns to operation S30. And if in operation S60, it is determined that the recording operation has been completed, in operation S80, the input of the high level signal to the LED module 300 stops. In operation S70, a determination is made as to whether the reproducing operation is completed. If in operation S70, it is determined that the reproducing operation has not been completed, the method returns to operation S30. And in operation S70, it is determined that the reproducing operation has been completed, in operation S80, the input of the high level signal to the LED module 300 stops.

As described above, in an optical recording and/or reproducing method and apparatus according to an aspect of the present invention, type and operation mode of an optical disc can be displayed to a user using a color of a beam from and an emission mode in an LED module, an emitting window of which is attached on a front surface of the optical recording and/or reproducing apparatus.

Although a few embodiments have been shown and described, it would be appreciated by those skilled in the art that changes may be made therein in this embodiment without departing from the principles and the spirit of the present invention, the scope of which is as defined in the claims and their equivalents.

What is claimed is:

1. A method to display a status of an optical recording and/or reproducing apparatus, comprising:
   determining a type of an optical disc loaded into a tray; and
   transmitting a predetermined signal based on the determination result to a laser emitting diode module comprising at least two laser emitting diodes, which emit different color beams so that the laser emitting diode module emits a color beam in accordance with the determined type of the optical disc.

2. The method of claim 1, further comprising:
   driving the laser emitting diode module so that an emission mode of the laser emitting diode module is changed based on which operation is performed on the optical disc.

3. The method of claim 2, wherein the emission mode of the laser emitting diode module comprises a blink mode indicative of an operation being performed.

4. An apparatus to display a status of an optical recording and/or reproducing apparatus, comprising:
   an optical pickup to radiate light onto an optical disc and to receive the light reflected from the optical disc;
   a system controller to control the optical pickup, to determine a type of the optical disc from an optical signal received via the optical pickup, and to perform a servo operation depending on the determined type of the optical disc; and
   a laser emitting diode module connected to the system controller, including at least two laser emitting diodes, which emit different color beams so that the system controller drives the laser emitting diode module to emit a color beam in accordance with the determined type of the optical disc.

5. The apparatus of claim 4, wherein the system controller drives the laser emitting diode module so that an emission mode of the laser emitting diode module is changed depending on which operation is performed on the optical disc.

6. The apparatus of claim 5, wherein an emission mode of the laser emitting diode module driven by the system controller comprises a blink mode indicative of an operation being performed.

7. The apparatus of claim 4, further comprising:
   a radio frequency amplifier to convert the signal received from the optical pickup into an electric signal, and to detect a surface reflection signal reflected from a surface of the optical disc and an S-Curve signal detected from a recording surface of the optical disc.

8. The apparatus of claim 7, wherein the system controller compares a time interval between the surface reflection signal and the S-Curve signal detected by the radio frequency amplifier with a predetermined reference value.

9. The apparatus of claim 8, wherein the system controller determines that the optical disc is a digital versatile disc when distance between the surface of the optical disc, and the recording surface is 0.6 mm and the time interval is less than the predetermined reference value.

10. The apparatus of claim 8, wherein the system controller determines that the optical disc is a compact disc when distance between a disc surface and a recording surface is 1.2 mm, and the time interval is more than the predetermined reference value.

11. The apparatus of claim 4, wherein the at least two laser emitting diodes of the laser emitting diode module comprise: first and second laser emitting diodes.

12. The apparatus of claim 11, further comprising:
negative nodes that are grounded, provided to the first and second laser emitting diodes;
positive nodes connected to the system controller to be used as input nodes, provided to the first and second laser emitting diodes;
a housing having at least one side made of a semitransparent or transparent window to surround the first and second laser emitting diodes; and
a groove into which the semitransparent or transparent window of the housing is inserted, which is formed in a front surface of the optical recording and/or reproducing apparatus.

13. The apparatus of claim 12, wherein
only the first laser emitting diode emits light when the system controller outputs a high level signal only to the positive node of the first laser emitting diode; and
both first and second laser emitting diodes emit light when the system controller simultaneously outputs the high level signal to the positive nodes of each of the first and second laser emitting diodes.

14. The apparatus of claim 12, wherein only the second laser emitting diode emits light, when the system controller outputs a high level signal only to the positive node of the second laser emitting diode.

15. The apparatus of claim 12, wherein the system controller outputs a signal to the positive nodes of the first and/or second laser emitting diodes based on the type of the optical disc.

16. The apparatus of claim 15, wherein when the system controller outputs the signal to the positive nodes of the first and/or second laser emitting diodes, the system controller toggles the signal so that the signal is alternatively high and low to allow the light to blink.

17. A method to display a status of an optical recording and/or reproducing apparatus, comprising:
determining a type of an optical disc loaded into a tray; and
transmitting a predetermined signal based on the determination result to a laser emitting diode module; and
emitting a light beam in accordance with the determined type of the optical disc.

18. The method according to claim 17, further comprising:
converting the signal received from the optical pickup into an electric signal, and
detecting a surface reflection signal reflected from a surface of the optical disc and an S-Curve signal detected from a recording surface of the optical disc.

19. The method of claim 18, further comprising:
comparing a time interval between the surface reflection signal and the S-Curve signal detected by the radio frequency amplifier with a predetermined reference value.

20. The method of claim 19, wherein it is determined that the optical disc is a digital versatile disc when distance between the surface of the optical disc, and the recording surface is 0.6 mm and the time interval is less than the predetermined reference value.

21. The apparatus of claim 19, wherein it is determined that the optical disc is a compact disc when distance between a disc surface and a recording surface is 1.2 mm, and the time interval is more than the predetermined reference value.

22. An apparatus to display a status of an optical recording and/or reproducing apparatus, comprising:
an optical pickup to radiate light onto an optical disc and to receive the light reflected from the optical disc;
a system controller to control the optical pickup, to determine a type of the optical disc from an optical signal received via the optical pickup, and to perform a servo operation depending on the determined type of the optical disc; and
a light element connected to the system controller, which emits different color beams in accordance with the determined type of the optical disc.

* * * * *